H. E. & C. A. GREGORY.
HAY SHOCKER.
APPLICATION FILED JULY 25, 1914.
1,149,910.
Patented Aug. 10, 1915.
3 SHEETS—SHEET 3.
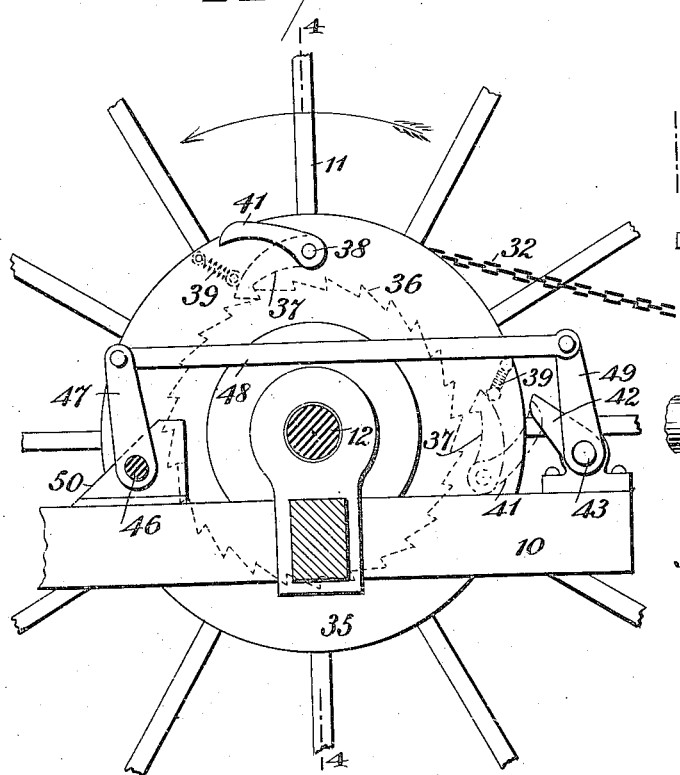
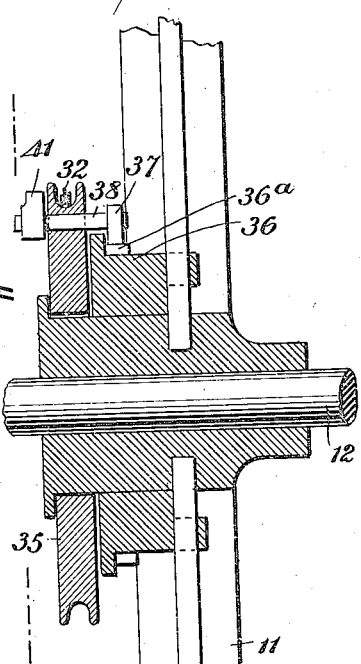
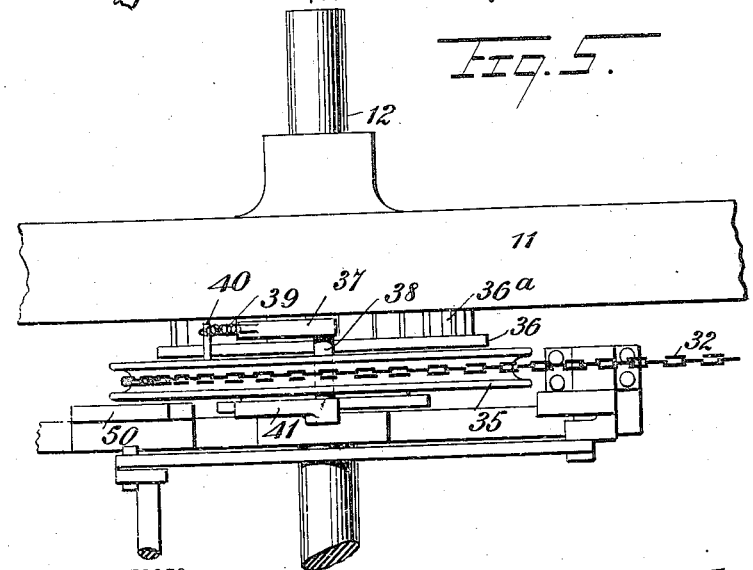
WITNESSES
INVENTORS
Henry E. Gregory
Charles A. Gregory
BY
ATTORNEYS

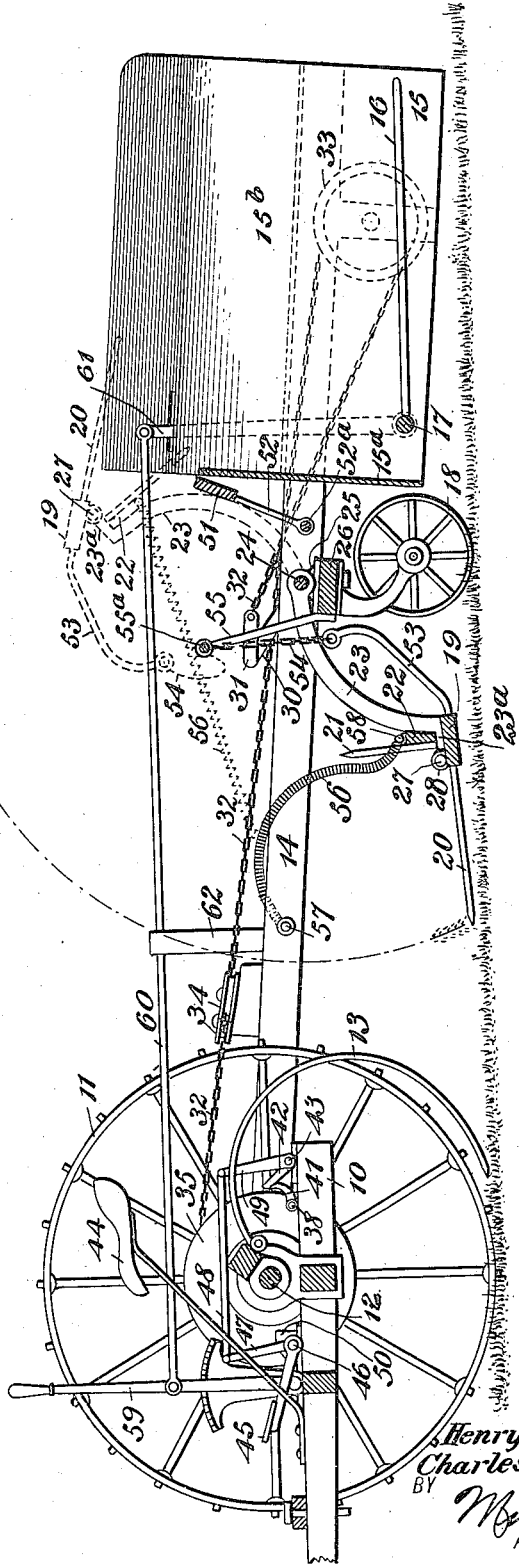

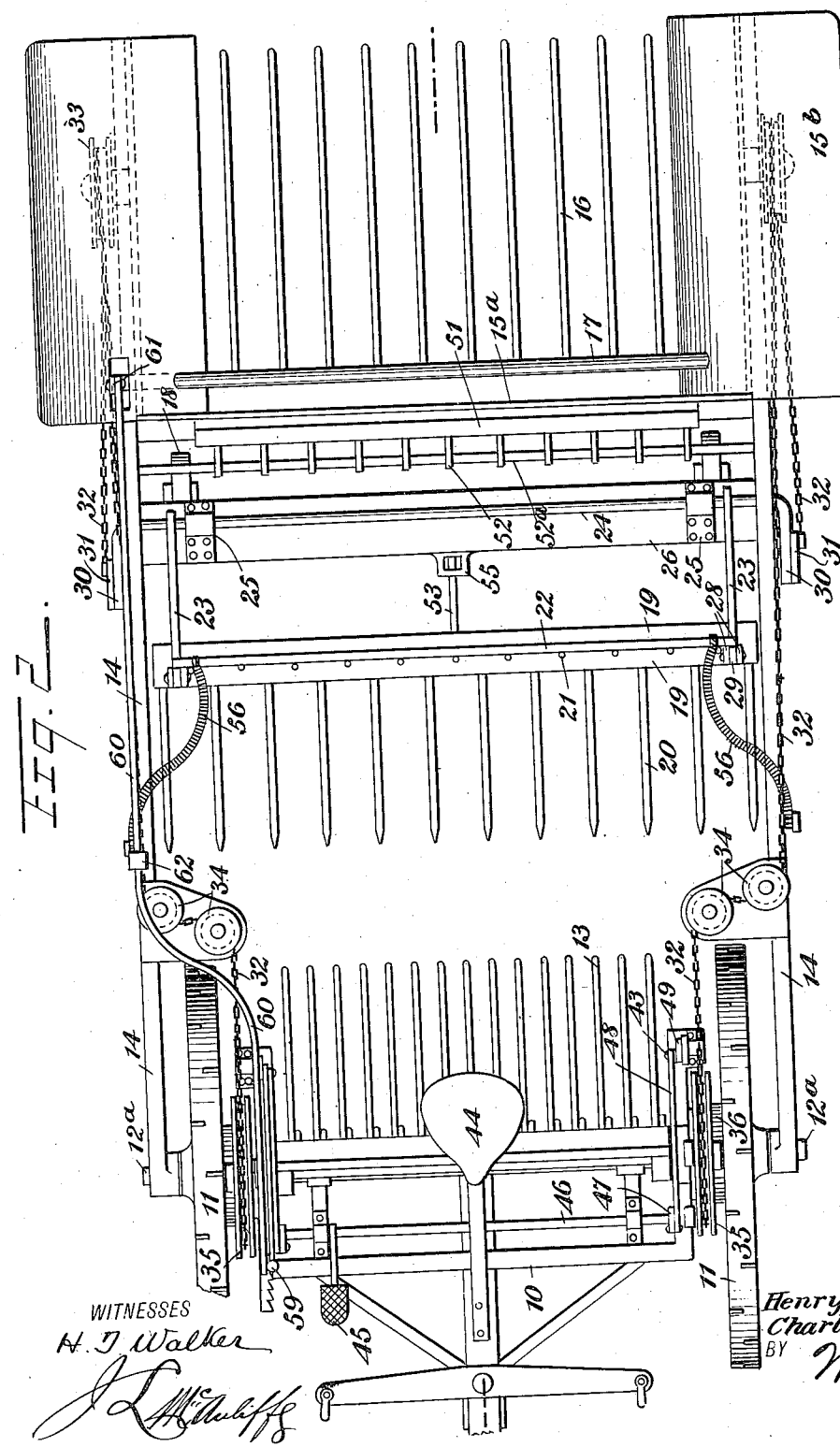

UNITED STATES PATENT OFFICE.

HENRY E. GREGORY AND CHARLES A. GREGORY, OF TRINIDAD, COLORADO.

HAY-SHOCKER.

1,149,910.　　　　　Specification of Letters Patent.　　　Patented Aug. 10, 1915.

Application filed July 25, 1914. Serial No. 853,137.

*To all whom it may concern:*

Be it known that we, HENRY E. GREGORY and CHARLES A. GREGORY, citizens of the United States, and residents of Trinidad, in the county of Las Animas and State of Colorado, have invented a new and Improved Hay-Shocker, of which the following is a full, clear, and exact description.

Our invention relates to a hay shocking apparatus to be associated with a hay rake, and following the latter, so that as the hay is raked and dumped in a windrow, the shocking apparatus will pick up the dumped hay and deposit the same in a receptacle. When sufficient hay has been accumulated in the receptacle to form a shock the shock is dumped by dropping the bottom.

The invention will be particularly explained in the specific description following.

Reference is to be had to the accompanying drawings forming a part of this specification, in which similar characters of reference indicate corresponding parts in all the views.

Figure 1 is a longitudinal sectional view of a hay shocker embodying our invention, showing the same in connection with a hay rake modified in certain particulars to embody features for the operation of the shocker; Fig. 2 is a plan view, certain parts of the operating devices being omitted in the interest of clearness; Fig. 3 is a fragmentary longitudinal vertical section on an enlarged scale, of certain operative devices on the rake, giving one example of means for the purpose; Fig. 4 is a transverse vertical section on the line 4—4 of Fig. 3; and Fig. 5 is a plan view of the parts shown in Figs. 3 and 4.

In constructing a practical embodiment of our invention in accordance with the illustrated example, a rake is employed, which in its general features may be of any approved construction, there being shown here more or less conventionally, a frame 10 having running wheels 11 on an axle 12, and having any known form of dumping rake 13.

The shocker is attached to the rake, to follow the latter, for which purpose in the illustrated form, the ends 12$^a$ of the axle 12 are extended sufficiently to receive the forward ends of the side bars 14 of the shocker frame. At the rear end of the bars 14, is a receptacle or shocker case 15, having a fixed front 15$^a$ and fixed upwardly flaring sides 15$^b$. The rear end of the shocker case is open. A drop bottom is provided for the shocker case, preferably consisting of a grid, presenting rearwardly extending tines 16 and a head 17, which is rockably mounted at its ends in the sides of the shocker case 15. The shocker has any suitable supporting wheels 18.

The shocker includes a pick-up fork following the dumping rake 13, the said fork having a head or cross bar 19 from which extend forwardly projecting pick-up fingers or tines 20. In the rear of the tines 20, perpendicular tines 21 are provided, which in effect form a rack to retain the hay on the tines 20, the said perpendicular tines being secured to a cross bar 22 above the cross bar 19. The fork is supported on carrying arms 23, which are in fixed relation to a rock shaft 24 supported on bearings 25 on a cross bar 26 secured to the longitudinal frame bars 14 of the shocker. The wheels 18 of the shocker are preferably secured to the said cross bar 26.

The fork is so constructed that the pick-up fingers 20 and the head or cross bar 19 carrying the same, may have pivotal movement relatively to the perpendicular tines or rack 21. The pivotal connection may be established by pivots 27, near each end, which pass through hinge lugs 28 on the cross bar 19 and a hinge lug 29 on the carrying arms 23 of the fork.

The fork-operating means are actuated from devices advantageously arranged on the rake so as to be controlled by the driver, and have operative connection with the rock shaft 24 to swing the fork vertically to dump the picked-up windrow into the shocker case 15.

Referring particularly to Figs. 1 and 2, it will be seen that the rock shaft 24 is formed with crank arms 30, the upper ends 31 of which are return-bent rearwardly. A chain 32 is secured at one end to each member 31 of a crank arm 30, there being a chain at each side of the rake. The chains extend from the crank arms of the rock shaft rearwardly around idler sprockets 33 on the sides of the rocker case 15, and said chains extend forwardly and preferably around guide sheaves 34, to a connection with operating drums 35 on the rake.

The drums 35 are loose on the axle 12 of the rake, and means is provided under the control of the driver to throw the drums into and out of gear with the wheels 11, so that the drums may be given a partial turn to dump the fork. We have illustrated one means for making and breaking the operative connection between the chain-actuating drums and the wheels 11. As the drums and their appurtenances are the same at each side of the rake, it will suffice to describe the devices at one side. On each wheel 11 is secured a ratchet wheel 36 to rotate with the wheel 11, the annular series of ratchet teeth being indicated by the numeral 36a. A pawl 37 adapted to engage with the ratchet teeth 36a is carried by a loose drum 35, said pawl being mounted on a rockable pin or shaft 38. A retractile spring 39 is secured to the pawl 37 and to a pin 40 in the drum 35. Said spring normally tends to maintain the pawl out of engagement with the ratchet teeth 36a. Fixed on the shaft or pin 38 on the outside of the drum 35, is an arm 41, and means is provided under the control of the driver to engage the said arm 41 and so rock its shaft 38 as to throw the pawl 37 into engagement with the ratchet wheel 36.

With the illustrated means for controlling the arm 41, the normal position of the arm 41 when the fork is in the lowered position, is adjacent to a rocker arm 42 on a shaft 43, rockable in suitable bearings on the frame 10 of the rake, and the said shaft is adapted to be rocked by the driver from his seat 44 on the rake. The operative connections with the shaft 43 may consist of a pedal 45 on a shaft 46 carrying an arm 47 connected by a link 48 with a similar arm 49 on the rock shaft 43. Thus the driver by pressing down on the pedal 45 will rock the arm 42 inwardly into contact with the arm 41 on the shaft 38, and thus rock the pawl 37 into position to be engaged by a tooth 36a on the ratchet wheel 36 and thereby cause the drum 35 to be turned forwardly. The normal position of the arm 41 is illustrated in Fig. 1, and in dotted lines in Fig. 3. The position of the arm 41, in full lines Figs. 3 to 5, is an intermediate one when said arm is being carried by the turning of the drum from the original position adjacent to the arm 42. The continued movement of the drum 35 and the arm 41 and pawl 37, will cause the said arm 41 to be engaged by a tripper device to automatically throw the pawl out of engagement with the ratchet wheel 36. The said tripper device may consist of a bracket 50 having an inclined surface so that the engagement of the arm 41 with said inclined surface will rock the said arm upwardly and thus rock the pawl 37 out of engagement, and thereby disconnect the drum 35. While the pawl is engaged, the drum 35 will be turned through such an angle and will be of such a diameter as to wind in the proper length of the chain 32 to give the lifting movement to the fork by a pull of the chains on the arms 30, 31, of the shaft 24.

It is required only that the fork be swung to a position beyond a vertical line passing through the shaft 24 so that the preponderance of weight of the fork will be rearward of the said vertical line. The momentum of the fork will cause it to bring up against a stop provided at the forward end of the shocker case 15. Preferably the stop takes the form of a cross bar 51, which may be mounted on a rack 52, secured at its lower end as at 52a to the side bars 14 of the shocker. The preponderance of the weight of the fork will tend to maintain the fork in the raised position against the stop 51. The pivotal connection of the tines 20 and head 19 with the lifting arms 23 permits the said tines to rock relatively to the tines 21, so that when the arms 23 and the tines 21 are arrested, a relative movement of the tines 20, as well as the momentum of the hay, will cause the latter to be dumped from the fork into the shocker case 15.

It is to be noted that as the fork approaches the dumping position it will be released from operative control by the drum 35, owing to the automatic disengagement of the pawl 37 and the ratchet wheel 36. In order to cause the fork to return to the lowered position we provide retractile springs 56, connected at one end, as at 57, to the side bars 14 and connected at the opposite end with the cross bar 22, or equivalent rigid member of the fork. The arrangement is such that the said springs 56 will be placed under tension by the final movement of the fork, when momentum has carried it to a position against the stop 51, and therefore the said fork having dumped and having been released by the disengagement of the drum 35, will be drawn backwardly by the reaction of the springs 56 a sufficient distance to bring the preponderance of weight forward of the pivotal center, so that the fork will then gravitate to the lowered position.

We provide means whereby when the fork drops to the lowered position, the pick-up tines 20 will be positioned sufficiently close to the ground to effectively pick up the hay, and will be prevented from dropping to a position to dig into the ground. For the desired purpose the head or cross bar 19 carrying the pick-up tines 20 is provided with a rearwardly extending arm 53 (Figs. 1 and 2), to the upper end of which is connected one end of a short chain 54, the opposite end of said chain being connected to an eye 55a on the upper end of an arm 55, said arm being rigidly secured at its lower end to the cross bar 26, so that the said chain will limit the downward movement of the arm 53 and cause a movement of the head 19 and its pick-up fingers 20 on the pivots 27, thereby disposing the pick-up tines at the proper downward inclination. The movement of the head 19 on the pivots 27 may, if desired, be limited, as shown best in Fig. 1, by the feet 23ª on the lower ends of the fork-carrying arms 23.

It will be observed that the retaining tines 21 are rigid with the fork-carrying arms 23, while the pivotal movement of the pick-up tines 20 is relative to the said carrying arms and relative to the said retaining tines; also the retaining tines are shorter. The result is that when the fork is in the dumping position, the said pick-up tines 20 will extend over the shocker case 15 and beyond the retaining tines 21, and the said pick-up tines will be permitted a downward drop independently of the carrying arms 23 and the retaining tines 21.

When sufficient hay has been deposited in the receptacle 15 to form a shock, the said shock is dumped by the driver, this being accomplished by the hand lever 59 connected by a link 60 with an upwardly extending rocker arm 61 on the rock bar 17 of the grid 16 constituting the bottom of the shocker case 15.

It will thus be seen that the driver manually controls the dumping of the rake, and then manually controls the operating means for lifting the fork, following which the fork is automatically released from its operating means, and is automatically returned to the lowered position; the driver then having manual control of the grid and the shocker case for dumping the accumulated shock.

Having thus described our invention, we claim as new, and desire to secure by Letters Patent:

1. The combination with a wheeled dumping rake, of a shocker case in the rear of the rake, a swinging pick-up fork between the shocker case and rake, lifting means to lift the fork and deposit material therefrom in said case, and means on the rake for actuating the said lifting means.

2. The combination with a wheeled rake, of a shocker case in the rear of the rake, a swinging pick-up fork between the shocker case and rake, operating means for lifting the said fork, said operating means including a flexible element having connection with the fork, a drum on the rake for winding said flexible element, and means for throwing the drum into driving connection with a revolving portion of the rake.

3. The combination with a wheeled rake, of a shocker case in the rear of the rake, a swinging pick-up fork between the shocker case and rake, operative means for lifting said fork, manually-controlled means on the rake for actuating the said operative means, and automatic means for releasing the operative means from the said actuating means.

4. The combination with a wheeled dumping rake, of a shocker case in the rear of the rake, a swinging pick-up fork adapted to pick up and deposit raked material in the said case, operating means for raising said fork, manually-controlled means on the rake for actuating said operating means, means to automatically throw the operating means out of action when the fork has been raised, and manually controlled means operative from the rake for dumping the shock.

5. In an apparatus of the character described, a shocker case, a swinging pick-up fork having carrying arms and operating means to lift said arms and swing the fork to a raised position and dump its load into the said case, the said fork having upwardly projecting retaining tines rigid with the carrying arms, and pick-up elements mounted to have pivotal movements relatively to the said retaining tines and relatively to the carrying arms.

6. In an apparatus of the character described, a supporting frame, and a pick-up fork comprising carrying-members pivotally mounted on the said frame for vertical swinging movement, retaining elements rigid with said carrying members and pick-up elements mounted on said carrying members for pivotal movement relatively to the said carrying members and relatively to said retaining elements.

7. In an apparatus of the character described, the combination with a wheeled rake, of a pick-up fork mounted for vertical swinging movement and arranged in the rear of the rake, operating means for lifting the fork, actuating means on the rake for said operating means, means for throwing said actuating means out of action, and retractile springs acting to give an initial lowering movement to the fork upon release of the actuating means.

8. In an apparatus of the character described, a supporting frame, a swinging fork on said frame, the fork comprising carrying members and pick-up elements, the pick-up elements being pivotally mounted on the carrying members, an arm on the pick-up elements, an upwardly extending fixed member on the frame in the rear of the fork and a flexible connection between the said arm and the said fixed member to limit the movement of said arm and thereby limit the movement of the pick-up elements.

9. In an apparatus of the character described, a supporting frame; a swinging fork on said frame, said fork comprising pick-up elements and swinging carrying members on which the pick-up elements are pivotally mounted; an arm on said pick-up elements; a flexible element connected at one end with the said arm; and means on the frame to which the said flexible element is connected at its opposite end.

10. In an apparatus of the character described, the combination with a wheeled rake, of a winding drum thereon, means for throwing the drum into and out of action, a shocker case in the rear of the rake, a vertically swinging pick-up fork adapted to dump material into the case, a flexible operating element to lift said fork, said element having connection with the fork and with the said drum, to be wound on the latter, the fork having upward movement to a position beyond a vertical line passing through its pivotal center, means whereby to cause a lowering movement of the fork after dumping, and means for dumping the shock from the shocker case.

In testimony whereof we have signed our names to this specification in the presence of two subscribing witnesses.

HENRY E. GREGORY.
CHARLES A. GREGORY.

Witnesses:
A. E. McGLASHAN,
BERNARD A. GOW.